United States Patent Office 3,364,062
Patented Jan. 16, 1968

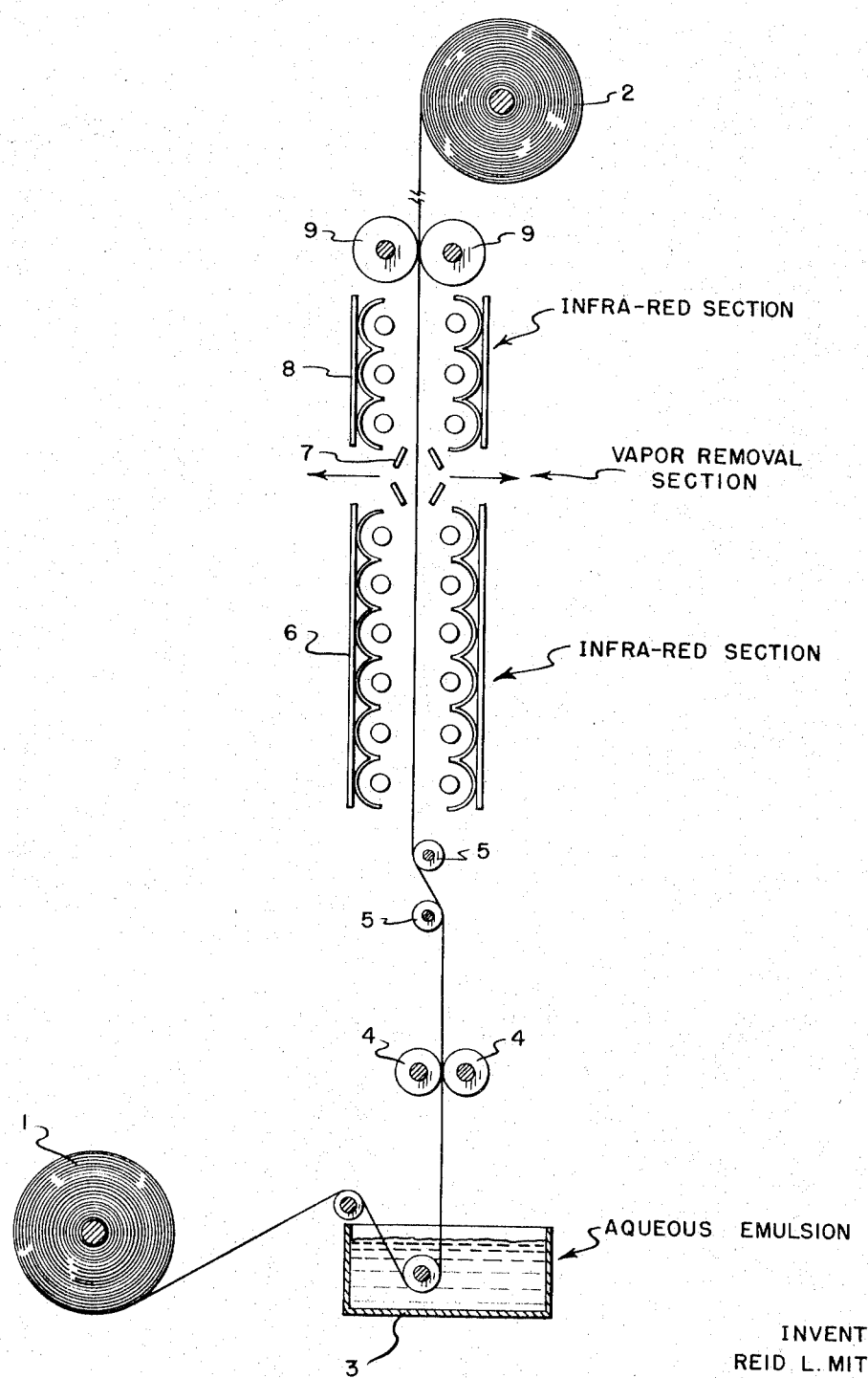

3,364,062
EMULSION COATING OF CELLULOSIC FILMS
Reid L. Mitchell and Charles F. Murphy, Morristown, and Douglas Allen, Parsippany, N.J., assignors to Rayonier Incorporated, Shelton, Wash., a corporation of Delaware
Filed Dec. 27, 1965, Ser. No. 516,507
7 Claims. (Cl. 117—93.31)

This invention relates to moisture proof cellulosic films coated with hydrophobic resins, and is particularly concerned with the process for applying emulsion coatings of thermoplastic hydrophobic resins to cellulosic films as described in the patent application of Reid L. Mitchell, Charles F. Murphy and Douglas Allen, Ser. No. 394,264, filed Sept. 3, 1964. The process of said patent application comprises heating the applied emulsion with infrared radiation to first flash off water followed by additional heating with infrared radiation of the residual thermoplastic coating to fuse the resin and bond it to the cellulosic film.

In the practical embodiment of said process the operation is carried out continuously and the coated film is wound into rolls. The results of the process are not entirely satisfactory due to an occasional sticking of some of the films together in the roll, a condition known in the industry as sticking or blocking. This invention is based on our discovery that the addition of small amounts of polyvinylpyrrolidone to the aqueous emulsion eliminates this sticking or blocking and results in an equally good product in a more usable state. Moreover, the polyvinylpyrrolidone does not impair the color or other properties of the film.

The process of said patent application is especially effective in the coating of alkali-soluble transparent films of hydroxyethylcellulose and also regenerated cellulose films, frequently called cellophane, with emulsions of such thermoplastic compositions as the copolymers of vinylidene chloride with other monomers. A family of such copolymers is made and sold by the Dow Chemical Company under the trade name Saran in which vinylidene chloride is copolymerized with vinyl chloride, acrylonitrile or methyl methacrylate. The aqueous coating emulsions formulated from the Saran type copolymers may also include a very small amount of polyethyleneimine "anchoring agent" which improves the adhesion to the film. Suitable emulsions of such thermoplastic resins usually contain from 10 to 50 percent by weight of the resin in water. Other suitable thermoplastic resins which may be applied to the films include polyethylene and polyamides together with some portion of organic solvent and surfactants which assist the emulsification in water, and in some cases, solvents such as toluene and/or isopropanol.

In the process of said application, the water of the applied aqueous emulsion is removed before it has been completely absorbed or penetrates too deeply into the base film by heating the coating to a temperature within about ±20° C. of the fusion point of the resin, preferably at a temperature equal to or above said fusion point in order to flash off the water and fuse and bond the resin to the film. The water of the emulsion is preferably flashed off very quickly with infrared radiation in the range of 3 to 4 microns before the water-sensitive base film can absorb any appreciable amount of water from the aqueous emulsion and swell or become distorted. Following the removal of water infrared radiation, preferably in the range of 6 to 9 microns, is applied on the residual resin coating to fuse the remaining resin into a consolidated smooth film which is chemically bonded to the base film.

The polyvinylpyrrolidone suitable for the invention is a white powder having a molecular weight of about 10,000, a maximum unsaturation of 1%, and is water soluble, being readily dissolved in the coating emulsion.

The process of the invention comprises the addition to an aqueous emulsion of a thermoplastic hydrophobic resin of a small amount of polyvinylpyrrolidone, preferably from 1 to 10% by weight based on the weight of the coating solids resulting in a transparent film having on one or both surfaces a hydrophobic coating which is free of distortion, with a clear and glossy surface that presents an effective moisture barrier and which is substantially free of sticking or blocking.

The accompanying drawing illustrates diagrammatically an arrangement of apparatus for treating a continuously moving base film of indefinite length according to the invention. The base film, for example hydroxyethylcellulose having about four percent of substituted ethylene oxide from the roll 1, is continuously passed through the system and the coated film is wound into roll 2. The base film enters the tank 3 and is coated on both sides with the aqueous emulsion, advantageously a Saran emulsion of vinylidene chloride copolymerized with vinyl chloride and containing polyethyleneimine as an internal anchoring agent and a polyvinylpyrrolidone having a preferred molecular weight of about 10,000 as an anti-blocking agent. Two contacting base films may be passed through the system in face-to-face contact to coat only one surface of each base film. The film or the films, as the case may be, passes between the doctor rolls 4 to remove excess emulsion and then over rolls 5 to smooth the applied emulsion. Each set of rolls 4 and 5 is power driven at a desired constant speed.

The coated film passes through the infrared section 6 and is heated by radiant energy, preferably at 3 to 4 microns. The residence time of the film should be less than four seconds from the coating of the base film with the aqueous emulsion to completion of the drying in the first infrared section 6. This rapid drying at about 400° C. flashes off most of the water and prevents any appreciable absorption of water into the base film. Substantial absorption of water into the base sheet causes distortion, and deformation resulting from shrinkage and swelling of the film in process. Film shrinks when dried, swells when wet primarily in thickness and in the transverse or width dimension. In section 7 the water vapor is vented to the atmosphere. The film then enters the infrared section 8 wherein a radiant energy, rather specific to the resin of the coating, is applied to fuse the resin and effect chemical bonding to the base film. It is preferred to use from 6 to 9 microns in this section. The film is then passed through chilled rollers 9 and then is wound into the roll 2. The resulting coated base film is transparent, substantially distortion-free, imperfection-free, streak-free, glossy and has good hydrophobic properties presenting an excellent barrier to transmission of water vapor. A base-film of hydroxyethyl cellulose is more dimensionally stable than a viscose base film. On the other hand, it is also more hydrophyllic than viscose which makes it difficult to coat with any aqueous media without distortion in ordinary systems. The two-stage infrared drying and fusion system of said patent application properly controlled to restrict penetration of the water into the base-film results in an excellent coating the properties of which are unimpaired by the use of the anti-blocking polyvinylpyrrolidone.

The following are examples of coating operations carried out in accordance with the invention:

*Example 1*

Hydroxyethylcellulose film, containing approximately 4% substituted ethylene oxide, was coated with an aqueous emulsion of 20% by weight of a copolymer of Saran (copolymer of vinylidene chloride, 93%, and vinyl chloride 7%), 15%, water 84.5% and surfactant, polyethylene-polyoxypropylene, 0.5% to which had been added 2% by weight of polyvinylpyrrolidone, based on the weight of the emulsion solids, as an anti-blocking agent. After passing over driven smoothing rolls 5, the film was dried rapidly during travel through a two stage infrared dryer; radiating at about 3 microns in the first section where the temperature was about 400° C. and radiating at about 8 michons in the second section 8, where the temperature was about 300° C. Chilled rollers 9 were used to cool the film to room temperature prior to windup into a roll.

Film appearance such as clarity and gloss and physical properties were excellent. The rolls were unwound easily after normal storage periods indicating absence of blocking.

Film coated under identical conditions, without polyvinylpyrrolidone in the coating emulsion, blocked (stuck) after a similar period of storage and could not be easily unwound.

*Example II*

A roll of hydroxyethylcellulose film with an approximate degree of substitution of 4% ethylene oxide was coated from an aqueous emulsion of a copolymer of vinylidene chloride and methyl methacrylate containing 20% copolymer by weight. The emulsion also contained 0.2% polyvinylpyrrolidone by weight to act as a release agent for preventing the finished rolls from becoming blocked and unusable.

The coating emulsion was regulated and distributed evenly on the film by metering rolls 4 and smoothing rolls 5 respectively; after which the film was led immediately into an infrared dryer 6. The film was first exposed in the lower stage to controlled radiation of 3 to 4 microns and temperatures of 400° C. for rapid removal of water. The upper infrared section 8 was at a temperature of 300° C. for radiation energy at 7 to 9 microns which is preferentially absorbed by the copolymer resin to fuse and flatten the coating, leaving it free of irregularities. Total drying time was about 4 secs. The film was then cooled quickly by passing it over chilled rollers 9 to room temperature before the windup stage where it was collected in roll 2.

Moisture proofing and heat sealing properties were excellent and film clarity and gloss were of unusually high quality. After storage the film was unwound without evidence of blocking. When the polyvinylpyrrolidone was omitted from the coating emulsion formula, blocking was prevalent.

We claim:

1. In a process for coating a regenerated cellulose or hydroxyethylcellulose film in which an aqueous emulsion of a thermoplastic hydrophobic resin is applied on the film and the water of the emulsion is flashed off by heating with infrared radiation, and the residual resin is heated by infrared radiation to fuse the resin and adhesively bond it to the film, the improvement which comprises incorporating in the aqueous emulsion from 1 to 10% by weight based on the solids content of the emulsion of polyvinylpyrrolidone.

2. The process of claim 1 in which the film is hydroxyethylcellulose having from 3 to 8 percent by weight of substituted ethylene oxide and the resin is a copolymer of vinylidene chloride and one of the compounds vinyl chloride, acrylonitrile or methyl methacrylate.

3. The process of claim 1 in which the polyvinylpyrrolidone is water soluble having a molecular weight of about 10,000.

4. In a process for applying a hydrophobic coating on a film of hydroxyethylcellulose of indefinite length in which the film is continuously passed through stages of treatment comprising applying on at least one side of the film a uniform coating of an aqueous emulsion of a thermoplastic hydrophobic resin, promptly applying infrared radiation on the coating to flash off water, and then heating the residual resin with infrared radiation to fuse and bond the resin to the film, the improvement which comprises adding to the aqueous emulsion a small amount of polyvinylpyrrolidone.

5. The process of claim 4 in which the infrared radiation to flash off the water is in the range from 3 to 4 microns and is applied for 1 to 4 seconds after application of the emulsion and the infrared radiation to fuse the resin ranges from 6 to 9 microns and is applied for not more than about 1 second following water flash off.

6. The process of claim 1 in which the aqueous emulsion contains a copolymer of vinylidene chloride and a compound of the group consisting of vinyl chloride, acrylonitrile and methyl methacrylate.

7. The process of claim 4 in which the infrared red radiation is applied to the emulsion coating less than 4 seconds after applying the coating to minimize water penetration into the film, and after flashing off the water applying radiation of from 6 to 9 microns for from 1 to 3 seconds to fuse the coating resin.

References Cited

UNITED STATES PATENTS

| | | | |
|---|---|---|---|
| 2,618,575 | 11/1952 | Oswin | 117—145 X |
| 2,889,806 | 6/1959 | Conant | 117—119.6 X |
| 3,150,864 | 9/1964 | Fetner et al. | 34—4 X |

ALFRED L. LEAVITT, *Primary Examiner.*

J. H. NEWSOME, *Assistant Examiner.*